(12) United States Patent
Ueno et al.

(10) Patent No.: US 11,689,296 B2
(45) Date of Patent: Jun. 27, 2023

(54) ON-BOARD COMMUNICATION SYSTEM, OPTICAL COUPLER, AND ON-BOARD DEVICE

(71) Applicant: SUMITOMO ELECTRIC INDUSTRIES, LTD., Osaka (JP)

(72) Inventors: Yuto Ueno, Osaka (JP); Toshihiro Ichimaru, Saka (JP); Yuta Miyagawa, Osaka (JP); Susumu Takeshima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 45 days.

(21) Appl. No.: 17/605,055

(22) PCT Filed: May 22, 2020

(86) PCT No.: PCT/JP2020/020218
§ 371 (c)(1),
(2) Date: Oct. 20, 2021

(87) PCT Pub. No.: WO2020/250640
PCT Pub. Date: Dec. 17, 2020

(65) Prior Publication Data
US 2022/0190935 A1 Jun. 16, 2022

(30) Foreign Application Priority Data
Jun. 14, 2019 (JP) .................. 2019-111044

(51) Int. Cl.
*H04J 3/06* (2006.01)
*H04B 10/80* (2013.01)
*H04B 10/272* (2013.01)
*H04L 12/28* (2006.01)
*B60R 16/023* (2006.01)

(52) U.S. Cl.
CPC ......... *H04B 10/801* (2013.01); *H04B 10/272* (2013.01); *H04J 3/0638* (2013.01); *H04L 12/2885* (2013.01); *B60R 16/0238* (2013.01)

(58) Field of Classification Search
CPC ............... H04B 10/801; H04B 10/272; H04B 10/2725; H04B 10/2755; H04B 10/27; H04B 10/0773; H04B 10/0775; H04B 10/0779; H04J 3/0638; H04J 14/0282; H04J 14/08; H04L 12/2885; B60R 16/0238
USPC ............................................ 398/98, 52, 164
See application file for complete search history.

(56) References Cited

U.S. PATENT DOCUMENTS

| | | | |
|---|---|---|---|
| 2010/0080559 A1* | 4/2010 | Sarashina | H04Q 11/0067 398/67 |
| 2016/0036523 A1* | 2/2016 | Zhao | H04B 10/0773 398/21 |
| 2016/0173530 A1 | 6/2016 | Miyake | |

FOREIGN PATENT DOCUMENTS

| | | | |
|---|---|---|---|
| JP | 2006-081127 A | | 3/2006 |
| JP | 2008-219352 A | | 9/2008 |
| JP | 2009-038464 A | | 2/2009 |
| JP | 2009038464 A | * | 2/2009 |
| JP | 2011-166549 A | | 8/2011 |

(Continued)

*Primary Examiner* — Hibret A Woldekidan
(74) *Attorney, Agent, or Firm* — Oliff PLC

(57) ABSTRACT

An on-board communication system includes an optical coupler that includes multiple optical transmission lines, and multiple on-board devices that are capable of communicating with each other with the optical coupler interposed therebetween.

13 Claims, 9 Drawing Sheets

(56) References Cited

FOREIGN PATENT DOCUMENTS

| JP | 2011166549 A | * | 8/2011 |
|---|---|---|---|
| JP | 2013-168865 A | | 8/2013 |

* cited by examiner

FIG. 10

| OUTPUT SOURCE | OUTPUT DESTINATION | RATIO |
|---|---|---|
| ECU1 | ECU2 | 33.3% |
| ECU1 | ECU3 | 33.3% |
| ECU1 | ECU4 | 33.3% |
| ECU2 | ECU1 | 50% |
| ECU2 | ECU3 | 25% |
| ECU2 | ECU4 | 25% |
| ECU3 | ECU1 | 50% |
| ECU3 | ECU2 | 25% |
| ECU3 | ECU4 | 25% |
| ECU4 | ECU1 | 50% |
| ECU4 | ECU2 | 25% |
| ECU4 | ECU3 | 25% |

ON-BOARD COMMUNICATION SYSTEM, OPTICAL COUPLER, AND ON-BOARD DEVICE

TECHNICAL FIELD

The present disclosure relates to an on-board communication system, an optical coupler, and an on-board device.

This application claims benefit of Japanese Patent Application No. 2019-111044 filed on Jun. 14, 2019, the entire contents of which are incorporated herein by reference.

BACKGROUND ART

In PTL 1 (Japanese Unexamined Patent Application Publication No. 2013-168865), an on-board network system described below is disclosed. That is, the on-board network system includes an on-board control device that includes a memory for storing definition data that defines a portion that is based on implementation on an on-board network among communication protocols used on the on-board network, and a communication protocol issue device that issues the definition data to the on-board control device. When a registration request to allow the on-board control device to participate in the on-board network is received from a registration device for allowing the on-board control device to participate in the on-board network, the communication protocol issue device authenticates the registration device, subsequently generates the definition data based on the implementation on the on-board network, and returns the definition data to the registration device. The registration device receives the definition data transmitted from the communication protocol issue device and requests the on-board control device control device to store the received definition data in the memory. The on-board control device receives the definition data from the registration device, stores the definition data in the memory, and communicates by using the on-board network in conformity with the communication protocol according to the portion defined by the definition data.

CITATION LIST

Patent Literature

PTL 1: Japanese Unexamined Patent Application Publication No. 2013-168865

SUMMARY OF INVENTION

An on-board communication system according to the present disclosure includes an optical coupler that includes multiple optical transmission lines, and multiple on-board devices that are capable of communicating with each other with the optical coupler interposed therebetween.

An optical coupler according to the present disclosure is an optical coupler that is used for an on-board communication system that includes a first on-board device, a second on-board device, and a third on-board device. The optical coupler includes a first optical transmission line that connects the first on-board device and the second on-board device to each other, and a second optical transmission line that connects the first on-board device and the third on-board device to each other.

An on-board device according to the present disclosure is an on-board device for an on-board communication system that includes an optical coupler that includes multiple optical transmission lines. The on-board device includes a communication unit that communicates with another on-board device with the optical coupler interposed therebetween, and a connection unit that is connectable to an optical fiber that is connected to the multiple optical transmission lines.

An aspect of the present disclosure can be achieved not only as an on-board communication system that includes such a characteristic processing unit but also as a method that includes a step of characteristic processing related thereto, or as a program that causes a computer to perform the step. An aspect of the present disclosure can be achieved as a semiconductor integrated circuit that serves as a part or the whole of an on-board communication system.

An aspect of the present disclosure can be achieved not only as an on-board device that includes such a characteristic processing unit but also as a method that includes a step of characteristic processing related thereto, or as a program that causes a computer to perform the step. An aspect of the present disclosure can be achieved as a semiconductor integrated circuit that serves as a part or the whole of an on-board device.

BRIEF DESCRIPTION OF DRAWINGS

FIG. 10 illustrates an example of the split ratio of each of optical transmission lines in the fourth modification to the on-board communication system according to the embodiment of the present disclosure.

DESCRIPTION OF EMBODIMENTS

Figure 1:
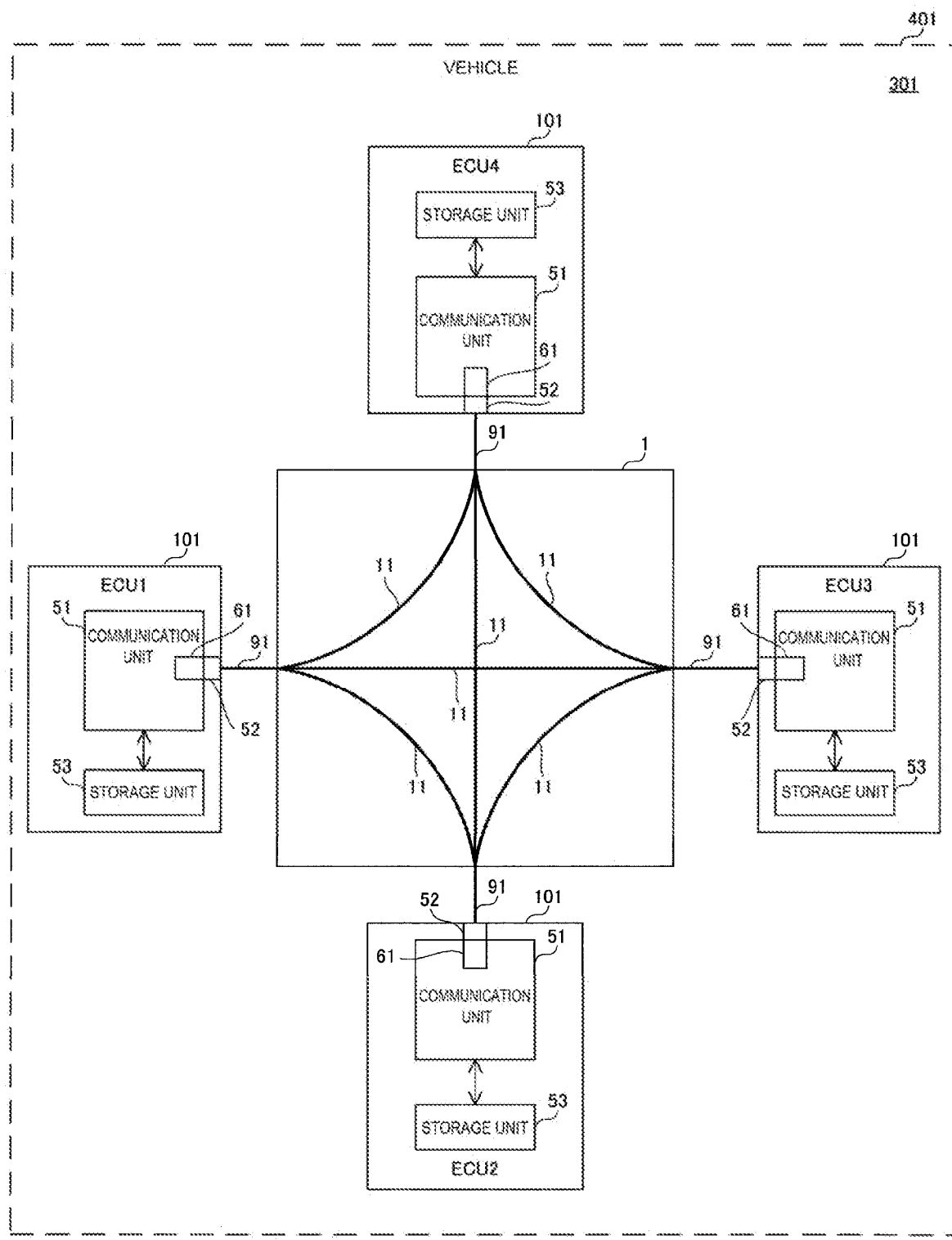
FIG. 1 illustrates the structure of an on-board communication system according to an embodiment of the present disclosure.

Problems to be Solved by Present Disclosure

The on-board network disclosed in PTL 1 includes a communication gateway that relays communication data that is transmitted or received between on-board ECUs (Electronic Control Units).

There is a need for a technique that enables an excellent system that performs communication between on-board devices to be constituted beyond the technique disclosed in PTL 1.

The present disclosure has been accomplished to solve the problem described above, and it is an object of the present disclosure to provide an on-board communication system, an optical coupler, and an on-board device that enable an excellent system that performs communication between on-board devices to be constituted.

Advantageous Effects of Present Disclosure

According to the present disclosure, an excellent system that performs communication between on-board devices can be constituted.

Description of Embodiment of Present Disclosure

The content of an embodiment of the present disclosure will be first listed and described.

(1) An on-board communication system according to the embodiment of the present disclosure includes an optical coupler that includes multiple optical transmission lines, and multiple on-board devices that are capable of communicating with each other with the optical coupler interposed therebetween.

Communication between the multiple on-board devices is thus performed by using the optical coupler that includes the multiple optical transmission lines. Consequently, a switch process, for example, is not needed, communication control can be simple, the use of an active element can be inhibited, and the weight of each transmission line can be decreased, for example, unlike a structure for telecommunication between on-board devices with a switch device. Accordingly, the cost of an on-board network can be decreased, size reduction can be achieved, and weight reduction can be achieved. For example, characteristics such as EMC and a transmission distance can be improved. Accordingly, an excellent system that performs communication between on-board devices to be constituted.

(2) The multiple on-board devices may include at least a master on-board device corresponding to the on-board device that transmits synchronization information for synchronizing transmission timings of the multiple on-board devices, and each of the multiple on-board devices other than the master on-board device may transmit information, based on the synchronization information that is received from the master on-board device to perform time division multiplexing communication.

With this structure, the communication between the on-board devices can be smoothly performed by a simple process.

(3) At least one of the multiple on-board devices may be connected to the other on-board devices that are capable of communicating with the optical coupler interposed therebetween.

With this structure, timing control for time division communication of the on-board devices, for example, can be implemented by using the optical coupler, and accordingly, the structure of each transmission line between the on-board devices can be simple.

(4) The optical coupler may further include an optical transmission line that connects the multiple optical transmission lines between the multiple on-board devices and an optical receiving circuit outside the optical coupler to each other and that is used for diagnosis to detect a state of the optical coupler.

With this structure, diagnosis of, for example, degradation over time can be effectively made for a transmission line structure that uses an optical coupler that has a high degree of necessity to monitor the degradation of, for example, the characteristics of a portion at which a transmission line is split, for example, unlike a structure for telecommunication between on-board devices with a switch device.

(5) An optical transmission line between the on-board devices that are specified among combinations of the multiple on-board devices that are connected to the optical coupler may be selectively provided in the optical coupler.

With this structure, an unnecessary optical transmission line for the optical coupler can be excluded from an on-board network on which the relationship of communication of the on-board devices is fixed, and parallel transmission of information can be achieved. Accordingly, communication capability on the on-board network can be increased.

(6) The optical coupler may include multiple optical transmission lines that are split in the optical coupler and that are connected to the on-board device that is common.

With this structure, the duplication of a communication unit of each on-board device and the duplication of a communication path can be achieved by using a simple structure in which the optical transmission lines are split in the optical coupler.

(7) The optical coupler may include multiple optical transmission lines that are split in the optical coupler, that are connected to the multiple on-board devices, and that have different split ratios.

With this structure, communication stability can be determined for every on-board device by using a simple method of designing the optical transmission lines of the optical coupler, and accordingly, the reliability of communication on the on-board network can be improved.

(8) The synchronization information may define a communication frame that contains multiple time slots, and the master on-board device may assign the multiple time slots to the multiple on-board devices in the synchronization information such that the multiple time slots are switched with a timing with which the multiple on-board devices do not transmit a packet.

With this structure, it is prevented that each on-board device transmits divided packets in communication frames and that another on-board device that is a receiver cannot receive the packets, and the communication between the on-board devices can be smoothly performed by a simple process.

(9) An optical coupler according to the embodiment of the present disclosure is an optical coupler that is used for an on-board communication system that includes a first on-board device, a second on-board device, and a third on-board device. The optical coupler includes a first optical transmission line that connects the first on-board device and the second on-board device to each other, and a second optical transmission line that connects the first on-board device and the third on-board device to each other.

The communication between the on-board devices is thus performed by using the optical coupler that includes the multiple optical transmission lines. Consequently, the switch process, for example, is not needed, the communication control can be simple, the use of the active element can be inhibited, and the weight of each transmission line can be decreased, for example, unlike a structure for telecommunication between on-board devices with a switch device.

Accordingly, the cost of the on-board network can be decreased, the size reduction can be achieved, and the weight reduction can be achieved. For example, the characteristics such as the EMC and the transmission distance can be improved. Accordingly, an excellent system that performs communication between on-board devices to be constituted.

(10) An on-board device according to the embodiment of the present disclosure is an on-board device for an on-board communication system that includes an optical coupler that includes multiple optical transmission lines. The on-board device includes a communication unit that communicates with another on-board device with the optical coupler interposed therebetween, and a connection unit that is connectable to an optical fiber that is connected to the multiple optical transmission lines.

The communication between the on-board devices is thus performed by using the optical coupler that includes the multiple optical transmission lines. Consequently, the switch process, for example, is not needed, the communication control can be simple, the use of the active element can be inhibited, and the weight of each transmission line can be decreased, for example, unlike a structure for telecommunication between on-board devices with a switch device. Accordingly, the cost of the on-board network can be decreased, the size reduction can be achieved, and the weight reduction can be achieved. For example, the characteristics such as the EMC and the transmission distance can be improved. Accordingly, an excellent system that performs communication between on-board devices to be constituted.

(11) The communication unit may be capable of communicating with multiple other on-board devices with the optical coupler interposed therebetween and may be capable of relaying information that is received from another on-board device to another on-board device that differs from the other on-board device via the optical coupler.

With this structure, a relay process among the other on-board devices can be achieved by using, for example, a simple structure in which each on-board device includes the single optical transceiver.

The embodiment of the present disclosure will now be described with reference to the drawings. In the drawings, portions like or corresponding to each other are designated by like reference signs, and a description thereof is not repeated. At least parts of the embodiment described below may be freely combined.

FIG. 1 illustrates the structure of an on-board communication system according to the embodiment of the present disclosure.

Referring to FIG. 1, an on-board communication system 301 includes an optical coupler 1, multiple optical fibers 91, and multiple on-board devices 101. The on-board communication system 301 is mounted on a vehicle 401.

In an example illustrated in FIG. 1, the on-board communication system 301 includes four on-board devices 101 but is not limited thereto and may include three on-board devices 101 or five or more on-board devices 101.

An example of each on-board device 101 is an ECU (Electronic Control Unit). In this example, the on-board communication system 301 includes an ECU 1 to an ECU 4 as the on-board devices 101.

Examples of each on-board device 101 include a TCU (Telematics Communication Unit), a central gateway (CGW), a human machine interface, a camera, a sensor, a driving assistance device, and a navigation device.

For example, the relationship of connection of the on-board devices 101 on the on-board network of the vehicle 401 is fixed. For example, the relationship of communication of the on-board devices 101 on the on-board network of the vehicle 401, that is, the relationship of an exchange of information is fixed.

The optical coupler 1 and the on-board devices 101 are connected to each other by using, for example, the optical fibers 91. That is, the multiple optical fibers 91 are connected between the optical coupler 1 and the multiple on-board devices 101.

The multiple on-board devices 101 of the on-board communication system 301 are capable of communicating with each other with the optical coupler 1 and the optical fibers 91 interposed therebetween. Information is exchanged between the on-board devices 101 by using an ethernet (registered trademark) frame in accordance with, for example, IEEE 802.3. The transmission speed of the ethernet frame is, for example, 1 Gbps (Giga bits per second) or 10 Gbps.

More specifically, each on-board device 101 includes a communication unit 51, a connection unit 52, and a storage unit 53. The optical coupler 1 includes multiple optical transmission lines 11 that connect the on-board devices 101 to each other. Each optical fiber 91 is connected to the optical transmission lines 11 associated therewith in the optical coupler 1.

In the example illustrated in FIG. 1, the optical transmission lines are split in the optical coupler 1, and consequently, all combinations of the on-board devices 101 are connected to each other with the optical transmission lines 11 interposed therebetween. The multiple optical transmission lines 11 connect respective different combinations of the on-board devices 101 to each other with the optical fibers 91 interposed therebetween.

More specifically, the optical coupler 1 includes the optical transmission line 11 that is connected between the ECU 1 and the ECU 2, the optical transmission line 11 that is connected between the ECU 1 and the ECU 3, the optical transmission line 11 that is connected between the ECU 1 and the ECU 4, the optical transmission line 11 that is connected between the ECU 2 and the ECU 3, the optical transmission line 11 that is connected between the ECU 2 and the ECU 4, and the optical transmission line 11 that is connected between the ECU 3 and the ECU 4.

The optical coupler 1 is, for example, a waveguide splitter or an optical fiber coupler. More specifically, each optical transmission line 11 of the optical coupler 1 can be formed by using, for example, a glass optical waveguide, a polymer optical waveguide, a semiconductor optical waveguide, or an optical fiber.

In each on-board device 101, the connection unit 52 is connectable to the optical fiber 91. The optical fiber 91 is connected to the on-board device 101 at the connection unit 52 by using, for example, a connector or adhesion.

The communication unit 51 includes an optical transceiver 61 and communicates with another on-board device 101 by transmitting or receiving an optical signal that contains the ethernet frame via the optical coupler 1 and the optical fiber 91.

More specifically, the communication unit 51 sets the MAC (Medium Access Control) address of the on-board device 101 that is a destination and its own MAC address as a destination MAC address and a source MAC address in the ethernet frame. The optical transceiver 61 of the communication unit 51 generates the optical signal that contains the ethernet frame and transmits the optical signal to the other on-board device 101 via the optical fiber 91 and the optical coupler 1.

The optical transceiver 61 of the communication unit 51 receives the optical signal via the optical coupler 1 and the optical fiber 91 and acquires the ethernet frame that is contained in the optical signal. The communication unit 51 checks the destination MAC address in the ethernet frame. In the case where the destination MAC address is its own MAC address, the communication unit 51 performs various processes by using information that is contained in the ethernet frame. The communication unit 51 discards the ethernet frame in the case where the destination MAC address in the ethernet frame is not its own MAC address.

For example, the storage unit 53 stores the MAC address of the owner on-board device 101 and the MAC addresses of the on-board devices 101 that are the destinations of various kinds of information. The communication unit 51 refers the MAC addresses that are saved in the storage unit 53 and generates the ethernet frame.

The on-board devices 101 are not limited by a configuration for communication by using the ethernet frame but may be configured for communication such that the optical signal contains data in another format such as a frame in accordance with a CAN (Controller Area Network) (registered trademark) standard.

Figure 2:
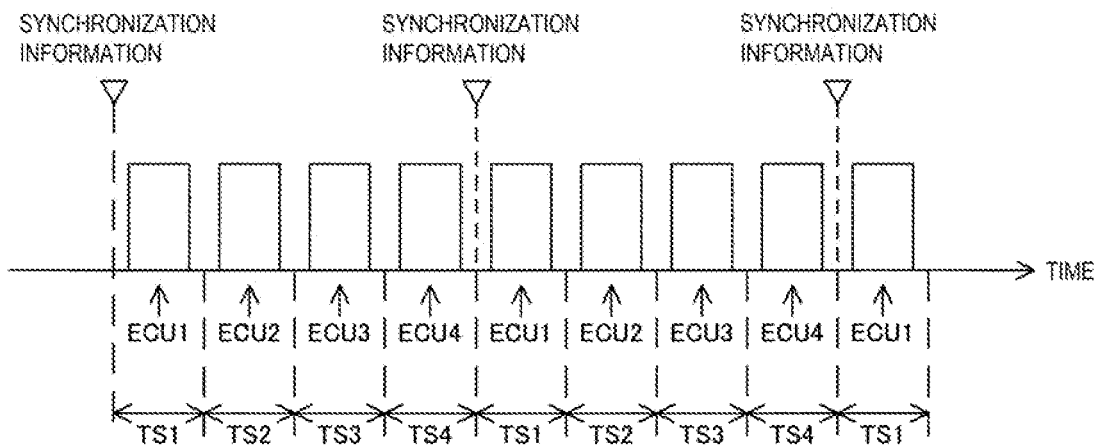
FIG. 2 illustrates an example of a transmission timing for information in the on-board communication system according to the embodiment of the present disclosure.

FIG. 2 illustrates an example of a transmission timing for information in the on-board communication system according to the embodiment of the present disclosure.

Referring to FIG. 2, the multiple on-board devices 101 of the on-board communication system 301 include a master on-board device corresponding to the on-board device 101 that transmits synchronization information for synchronizing transmission timings of the multiple on-board devices 101. As for the on-board communication system 301, the on-board devices 101 other than the master on-board device transmit information with a timing in accordance with the synchronization information that is received from the master on-board device, that is, based on the synchronization information to perform time division multiplexing communication.

In order to transmit the synchronization information to the on-board devices 101, at least one of the multiple on-board devices 101 of the on-board communication system 301 is connected to the other on-board devices 101 with the optical coupler 1 and the optical fibers 91 interposed therebetween. That is, at least one of the multiple on-board devices 101 is capable of communicating with the other on-board devices 101 with the optical coupler 1 and the optical fibers 91 interposed therebetween. In this example, the ECU 1 that transmits the synchronization information is connected to the ECUs 2 to 4.

More specifically, after starting-up, the ECU 1 that serves as the master on-board device broadcasts an ethernet frame that contains the synchronization information that represents a timing with which a communication frame starts, per predetermined cycle.

The ECU 1 is not limited by a configuration by which the synchronization information that is contained in the optical signal is transmitted but may transmit, for example, an electrical signal that represents the timing with which the communication frame starts as the synchronization information to the ECUs via an exclusive line.

The ECU 1 may transmit additional information other than the synchronization information or may transmit only the synchronization information.

The ECUs 1 to 4 of the on-board communication system 301 transmit information with the timing in accordance with the synchronization information, and consequently, the time division multiplexing communication is performed. More specifically, the ECU 1 transmits the information with the timing in accordance with the synchronization information that is generated by itself. The ECUs 2 to 4 transmit the information with the timing in accordance with the synchronization information that is received from the ECU For example, the synchronization information defines a communication frame that contains multiple time slots. In an example illustrated in FIG. 2, the communication frame is defined by an interval at which the synchronization information is transmitted and contains four time slots TS1 to TS4. The time slots TS1 to TS4 are assigned to the ECU 1 to the ECU 4, respectively. Each ECU is permitted to transmit the ethernet frame during the time slot that is assigned to itself and waits the ethernet frame from another ECU during the other time slots. That is, the ECUs 1 to 4 transmit or receive the information in a time division manner.

As for the on-board communication system 301, a communication frame length and a time slot length may be saved in the storage unit 53 of each ECU, or the communication frame length and the time slot length may be included in the synchronization information that is transmitted from the ECU 1.

As for the on-board communication system 301, the communication frame length and the time slot length may be actively assigned depending on the amount of transmission data of each ECU. That is, the communication frame length may be changed for every communication frame, or the lengths of the time slots TS1 to TS4 may differ from each other.

Specifically, for example, the ECUs 2 to 4 transmit the ethernet frame and subsequently notify the ECU 1 of the amount of data to be transmitted, that is, the amount of data that is not transmitted during the time slots that are assigned to themselves. The ECU 1 calculates the communication frame length and the time slot length of the ECUs 1 to 4, based on the remaining amount of data that is reported from the ECUs 2 to 4 and the amount of data that is not transmitted by itself and transmits the result of calculation that is added into the synchronization information.

For example, the master on-board device assigns the time slots to the on-board devices 101 in the synchronization information such that the time slots are switched with a timing with which the on-board devices 101 do not transmit a packet such as the ethernet frame.

Specifically, in the case of the ethernet, the minimum value and maximum value of an ethernet frame length and the minimum value of an interframe gap are defined as the standard, and as for the ethernet frame, values within these ranges can be set. In view of this, the ECU 1 sets the time slot length in the communication frame such that the ECU that is permitted to transmit the ethernet frame is changed during the interframe gap between the ethernet frames that are transmitted by the different ECUs and that are temporally adjacent to each other.

Figure 3:
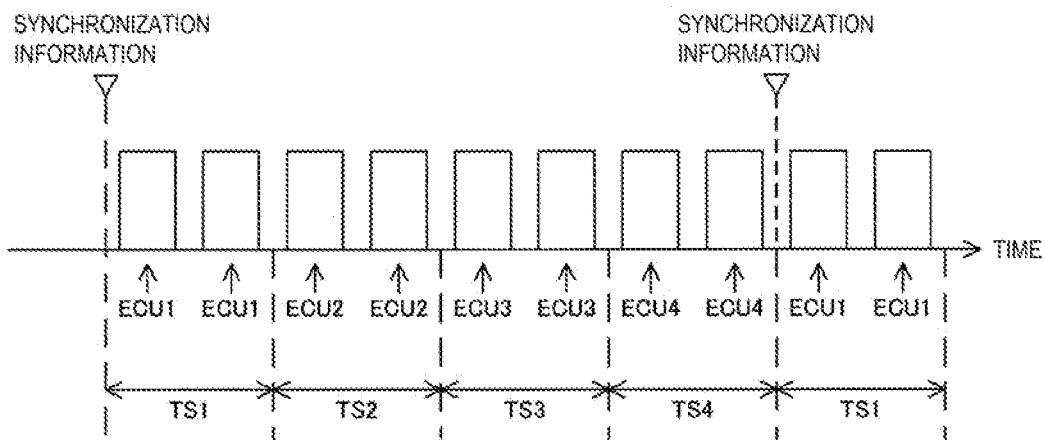
FIG. 3 illustrates an example of the transmission timing for information in the on-board communication system according to the embodiment of the present disclosure.

FIG. 3 illustrates an example of the transmission timing for information in the on-board communication system according to the embodiment of the present disclosure. FIG. 3 illustrates the case where an ethernet frame data length that has a fixed value.

Referring to FIG. 3, a time slot that has a length that enables two ethernet frames to be transmitted is assigned to the ECUs 1 to 4.

The ECUs 2 to 4 notify the ECU 1 of the number of the ethernet frames to be transmitted in the communication frame or a total data length. The ECU 1 assigns the time slots to the ECUs 2 to 4, based on the content of notification from the ECUs 2 to 4.

The ECU 1 may determine the number of the ethernet frames that can be transmitted during each time slot or the total data length without receiving notification from the ECUs 2 to 4 and may notify the ECUs 2 to 4.

Time slots that have lengths that enable different numbers of the ethernet frames to be transmitted may be assigned to the ECUs.

Figure 4:
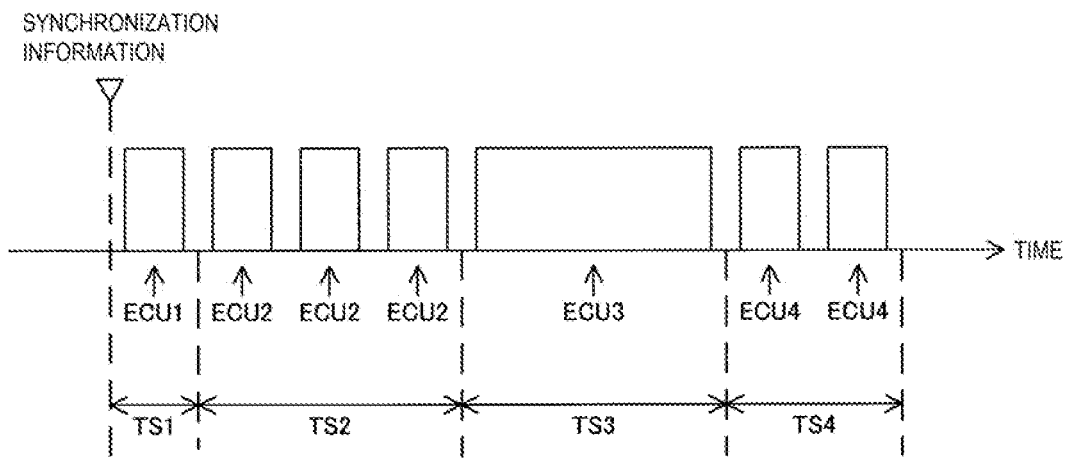
FIG. 4 illustrates an example of the transmission timing for information in the on-board communication system according to the embodiment of the present disclosure.

FIG. 4 illustrates an example of the transmission timing for information in the on-board communication system according to the embodiment of the present disclosure. FIG. 4 illustrates the case where the ethernet frame data length is variable.

Referring to FIG. 4, a time slot that has a length that enables a normal ethernet frame to be transmitted is assigned to the ECUs 1, 2, and 4, and a time slot that has a length that enables a jumbo frame to be transmitted is assigned to the ECU 3, and time slots that has lengths that enable an ethernet frame, three ethernet frames, an ethernet frame, and two ethernet frames to be transmitted are assigned to the respective ECUs 1 to 4.

The ECUs 2 to 4 notify the ECU 1 of the number of the ethernet frames to be transmitted in the communication frame, and the ethernet frame data length or the total data length.

The ECU 1 may determine the number of the ethernet frames that can be transmitted during each time slot, and the ethernet frame data length, or the total data length without receiving notification from the ECUs 2 to 4 and may notify the ECUs 2 to 4.

[First Modification]

Figure 5:
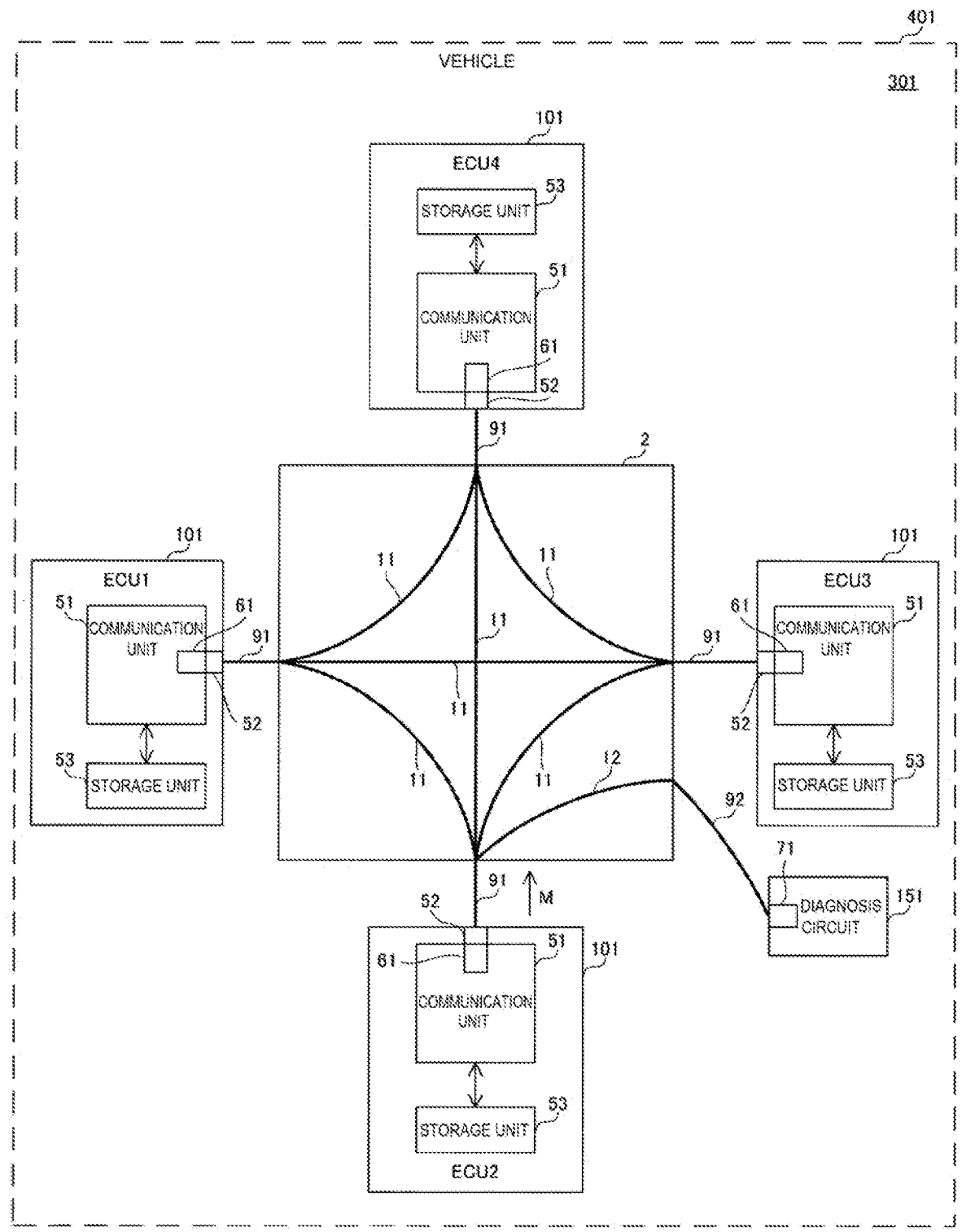
FIG. 5 illustrates the structure of a first modification to the on-board communication system according to the embodiment of the present disclosure.

FIG. 5 illustrates the structure of a first modification to the on-board communication system according to the embodiment of the present disclosure. Contents other than the contents described below are the same as those of the on-board communication system 301 illustrated in FIG. 1.

Referring to FIG. 5, a first modification to the on-board communication system 301 includes an optical coupler 2, the multiple optical fibers 91, the multiple on-board devices 101, an optical fiber 92, and a diagnosis circuit 151. The diagnosis circuit 151 includes an optical receiving circuit 71 that includes a photodiode. The optical coupler 2 further includes an optical transmission line 12 unlike the optical coupler 1.

The optical transmission line 12 is a transmission line that connects the optical transmission lines 11 between the on-board devices 101 and the optical receiving circuit 71 outside the optical coupler 2 to each other and that is used to detect the state of the optical coupler 2. That is, the optical transmission line 12 is connected to the optical receiving circuit 71 of the diagnosis circuit 151 with the optical fiber 92 interposed therebetween.

For example, the optical transmission line 12 is split at the optical transmission lines from the ECU 2 to the ECUs 1, 3, and 4.

The diagnosis circuit 151 measures the intensity of the optical signal that is received via the optical transmission line 12 and the optical fiber 92 by using the optical receiving circuit 71 and detects an anomaly, based on the result of measurement (also referred to below as a first result of measurement).

For example, the diagnosis circuit 151 detects the state of the optical coupler 2 such as an anomaly in the optical coupler 2, based on the first result of measurement and a second result of measurement with the ECU 2 about the intensity of the optical signal that is transmitted from the ECU 2. More specifically, the diagnosis circuit 151 receives an ethernet frame M that contains the second result of measurement from the ECU 2 and detects an anomaly related to changes in the split ratios of the optical transmission lines 11 of the optical coupler 2 and an increase in loss by comparing the first and second results of measurement.

The diagnosis circuit 151 is not limited by a configuration by which the anomaly in the optical coupler 2 is detected, but the diagnosis circuit 151 may transmit the first result of measurement to, for example, the ECU 3, and the ECU 3 may detect the anomaly, based on, for example, the first result of measurement.

The on-board communication system 301 may include neither the diagnosis circuit 151 nor the optical transmission line 12, and the ECU 2 or ECU 3, for example, may detect the anomaly, for example, based on the result of measurement with the ECU 2 about the intensity of the optical signal that is transmitted from the ECU 2 and the result of measurement with the ECU 3 about the intensity of the optical signal that is transmitted from the ECU 2.

[Second Modification]

Figure 6:
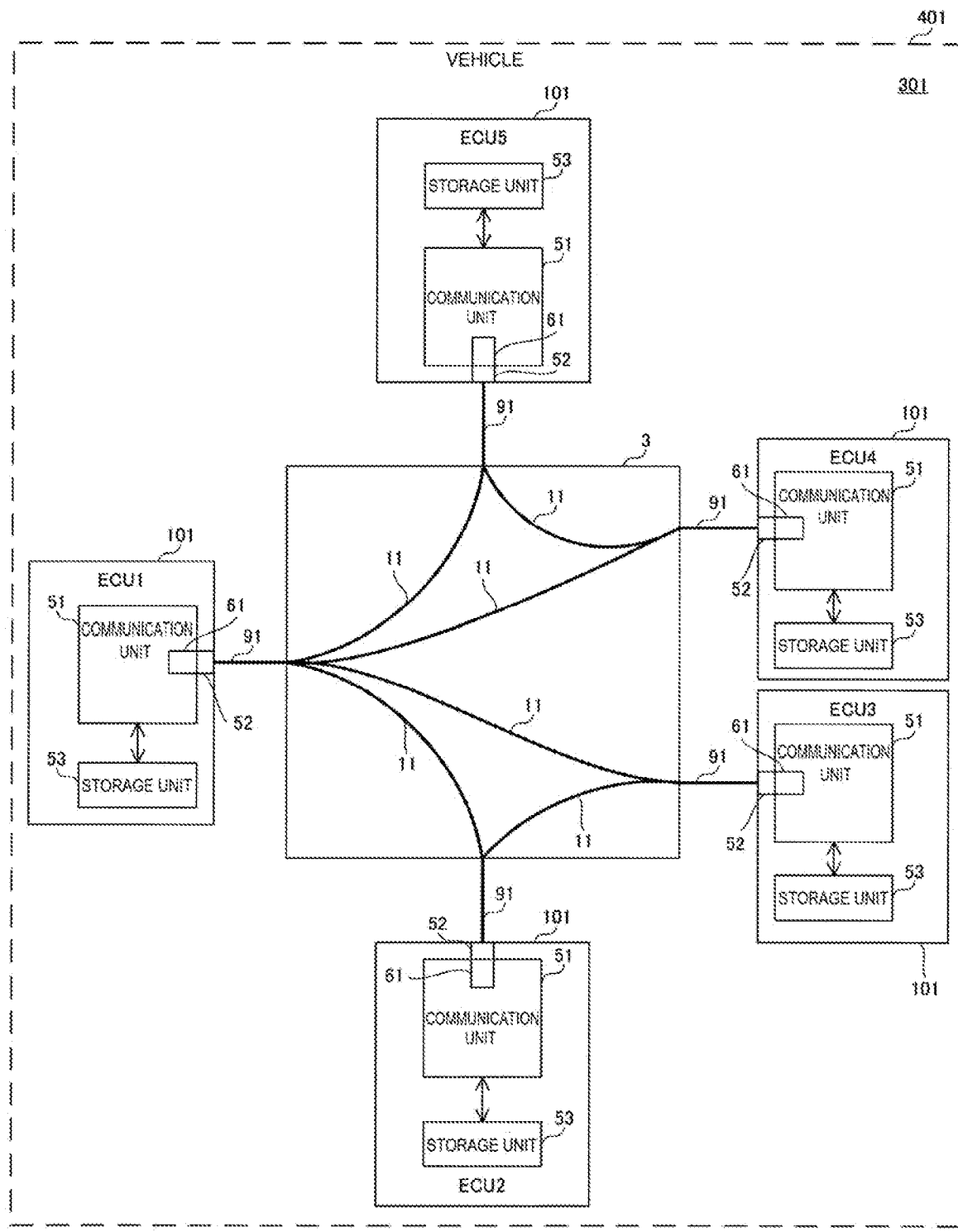
FIG. 6 illustrates the structure of a second modification to the on-board communication system according to the embodiment of the present disclosure.

FIG. 6 illustrates the structure of a second modification to the on-board communication system according to the embodiment of the present disclosure. Contents other than the contents described below are the same as those of the on-board communication system 301 illustrated in FIG. 1.

Referring to FIG. 6, the second modification to the on-board communication system 301 includes an optical coupler 3, the multiple optical fibers 91, and the multiple on-board devices 101.

In an example illustrated in FIG. 6, the on-board communication system 301 includes the ECU 1 to an ECU 5 as the on-board devices 101.

The optical transmission lines 11 between the on-board devices 101 that are specified among combinations of the multiple on-board devices 101 that are connected to the optical coupler 3 are selectively provided in the optical coupler 3. That is, the optical transmission lines 11 that are associated with specified combinations of the on-board devices 101 are selectively provided in the optical coupler 3.

In the example illustrated in FIG. 6, the optical transmission lines are split in the optical coupler 3, and some combinations of the on-board devices 101 of the on-board communication system 301 are connected to each other by using the optical transmission lines 11. More specifically, the optical coupler 3 includes the optical transmission line 11 that is connected between the ECU 1 and the ECU 2, the optical transmission line 11 that is connected between the ECU 1 and the ECU 3, the optical transmission line 11 that is connected between the ECU 1 and the ECU 4, the optical transmission line 11 that is connected between the ECU 1 and the ECU 5, the optical transmission line 11 that is connected between the ECU 2 and the ECU 3, and the optical transmission line 11 that is connected between the ECU 4 and the ECU 5.

For example, according to the second modification, it is not necessary to transmit information between the ECU 2 and the ECUs 4 and 5, and it is not necessary to transmit information between the ECU 3 and the ECUs 4 and 5. For this reason, in the optical coupler 3, the optical transmission lines that connect the ECU 2 and the ECUs 4 and 5 to each other are excluded, and the optical transmission lines that connect the ECU 3 and the ECUs 4 and 5 are excluded.

In this example, the ECU 1 that transmits the synchronization information is connected to the ECUs 2 to 5. That is, at least one of the multiple on-board devices 101 of the on-board communication system 301 is connected to the other on-board devices 101 with the optical coupler 3 and the optical fibers 91 interposed therebetween.

Figure 7:
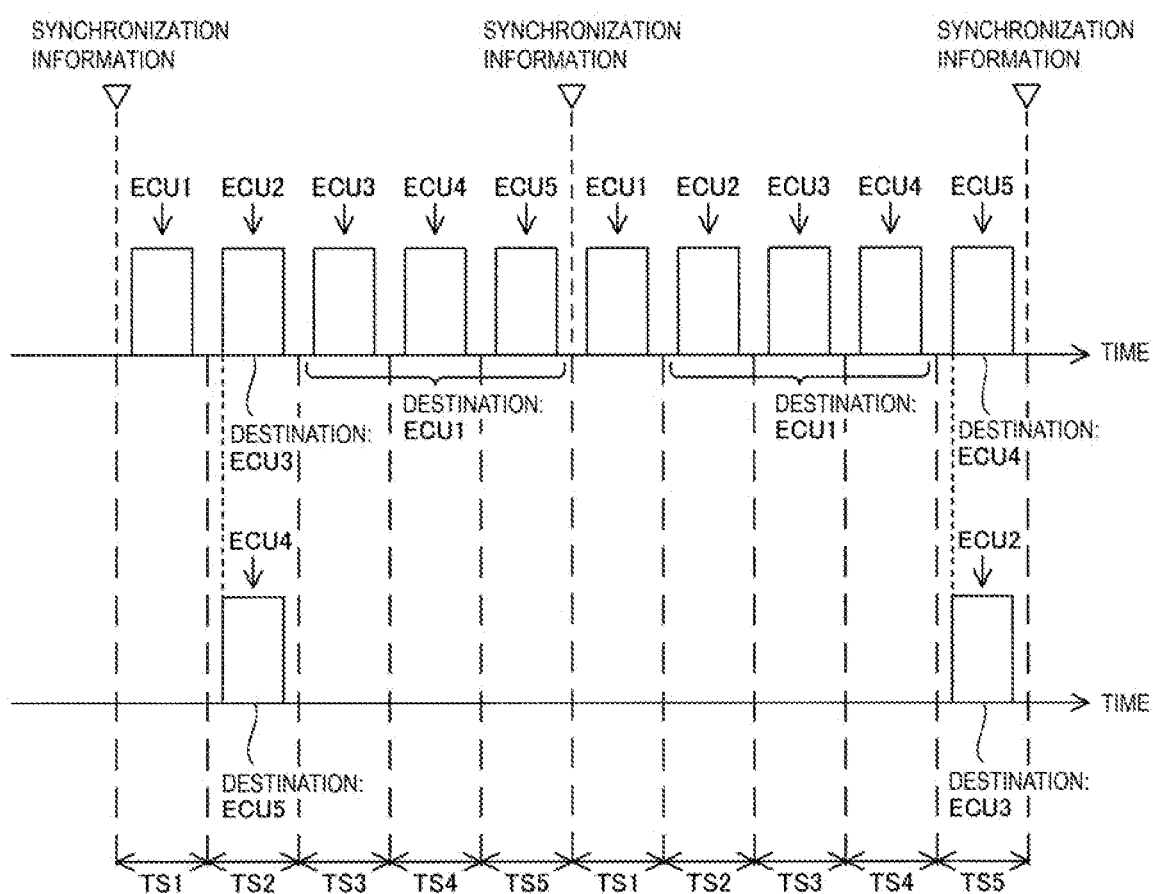
FIG. 7 illustrates an example of the transmission timing for information in the second modification to the on-board communication system according to the embodiment of the present disclosure.

FIG. 7 illustrates an example of the transmission timing for information in the second modification to the on-board communication system according to the embodiment of the present disclosure.

Referring to FIG. 7, according to the second modification to the on-board communication system 301, any combination of the on-board devices 101 that does not cause the optical signal to collide with those of the other combinations is permitted to transmit information with the same timing, that is, during the same time slot.

Specifically, even when the ethernet frames are simultaneously transmitted between the ECU 2 and the ECU 3 and between the ECU 4 and the ECU 5, no collision occurs. For this reason, transmission of the ethernet frames during the same time slot is permitted.

In an example illustrated in FIG. 7, the communication frame contains five time slots TS1 to TS5. The time slots TS1 to TS5 are assigned to the ECU 1 to the ECU 5, respectively.

During the time slot TS2 of a communication frame, the ethernet frame from the ECU 2 to the ECU 3 and the ethernet frame from the ECU 4 to the ECU 5 are transmitted. During the time slot TS5 of the next communication frame, the ethernet frame from the ECU 5 to the ECU 4 and the ethernet frame from the ECU 2 to the ECU 3 are transmitted.

For example, in the case where the ECU 2 is a sensor, the ECU 3 is an autonomous driving ECU, the ECU 4 and the ECU 5 provide an entertainment service, and communication between the ECUs 2 and 3 and the ECUs 4 and 5 is not needed, data communication capability on the on-board network can be increased in a manner in which the optical transmission lines 11 are formed as in the optical coupler 3.

[Third Modification]

Figure 8:
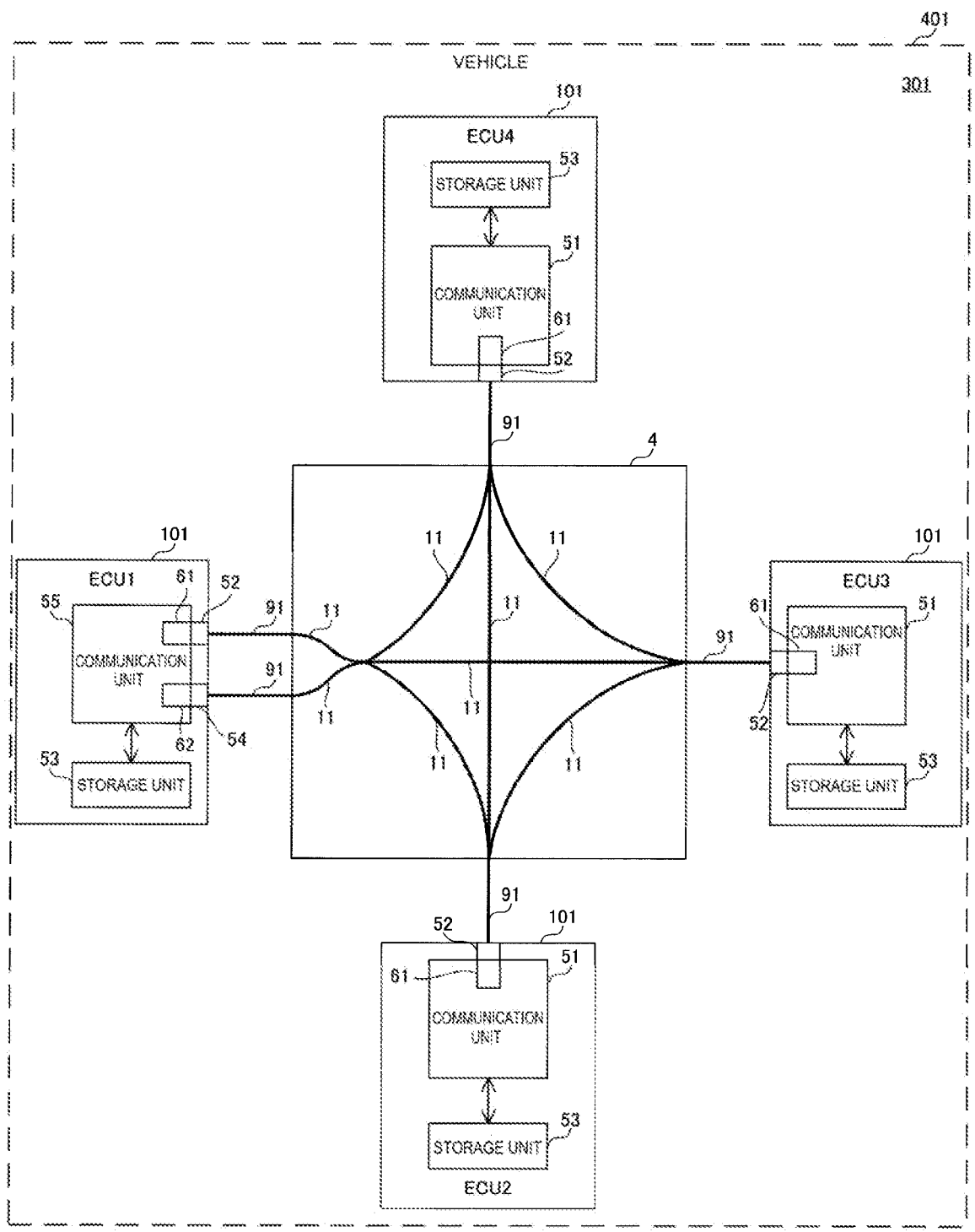
FIG. 8 illustrates the structure of a third modification to the on-board communication system according to the embodiment of the present disclosure.

FIG. 8 illustrates the structure of a third modification to the on-board communication system according to the embodiment of the present disclosure. Contents other than the contents described below are the same as those of the on-board communication system 301 illustrated in FIG. 1.

Referring to FIG. 8, the third modification to the on-board communication system 301 includes an optical coupler 4, the multiple optical fibers 91, and the multiple on-board devices 101.

The optical coupler 4 includes the multiple optical transmission lines 11 that are split in the optical coupler 4 and that are connected to the common on-board device 101 with the respective optical fibers 91 interposed therebetween.

More specifically, the on-board device 101 corresponding to the ECU 1 includes a communication unit 55, the connection unit 52, and a connection unit 54, and the storage unit 53.

In an example illustrated in FIG. 8, the optical transmission line at an input-output portion for the ECU 1 is split in the optical coupler 4 and connected to the ECU 1 with the optical fibers 91 interposed therebetween.

In the ECU 1, the connection units 52 and 54 are connectable to the optical fibers 91. The two optical fibers 91 are connected to the on-board device 101 at the connection units 52 and 54 by using, for example, connectors or adhesion.

The communication unit 55 includes the optical transceiver 61 and an optical transceiver 62 and communicates with another on-board device 101 by transmitting or receiving the optical signal that contains the ethernet frame via the optical coupler 4 and the optical fibers 91 as in the communication unit 51. The optical transceivers 61 and 62 are connected to the respective optical fibers 91 with the connection units 52 and 54 interposed therebetween.

During a normal operation, the ECU 1 communicates with the other ECUs by using the optical transceiver 61, and the optical transceiver 62 waits. In the case where the optical transceiver 61 malfunctions, the ECU 1 causes the optical transceiver 62 to operate and communicates with the other ECUs by using the optical transceiver 62. The optical transceivers may be switched autonomously by the ECU 1 or manually.

Such duplication is particularly effective for an important ECU such as the autonomous driving ECU or an ECU that is installed at a location in the vehicle 401 at which an environmental load such as temperature is high.

That is, as for the third modification to the on-board communication system 301, the optical coupler 4 is designed depending on the kind of the on-board devices 101, for example, as a result of attention being paid to that the relationship of connection of the on-board devices 101 on the on-board network of the vehicle 401 is fixed, and that the relationship of communication of the on-board devices 101, that is, the relationship of an exchange of information is fixed.

[Fourth Modification]

Figure 9:
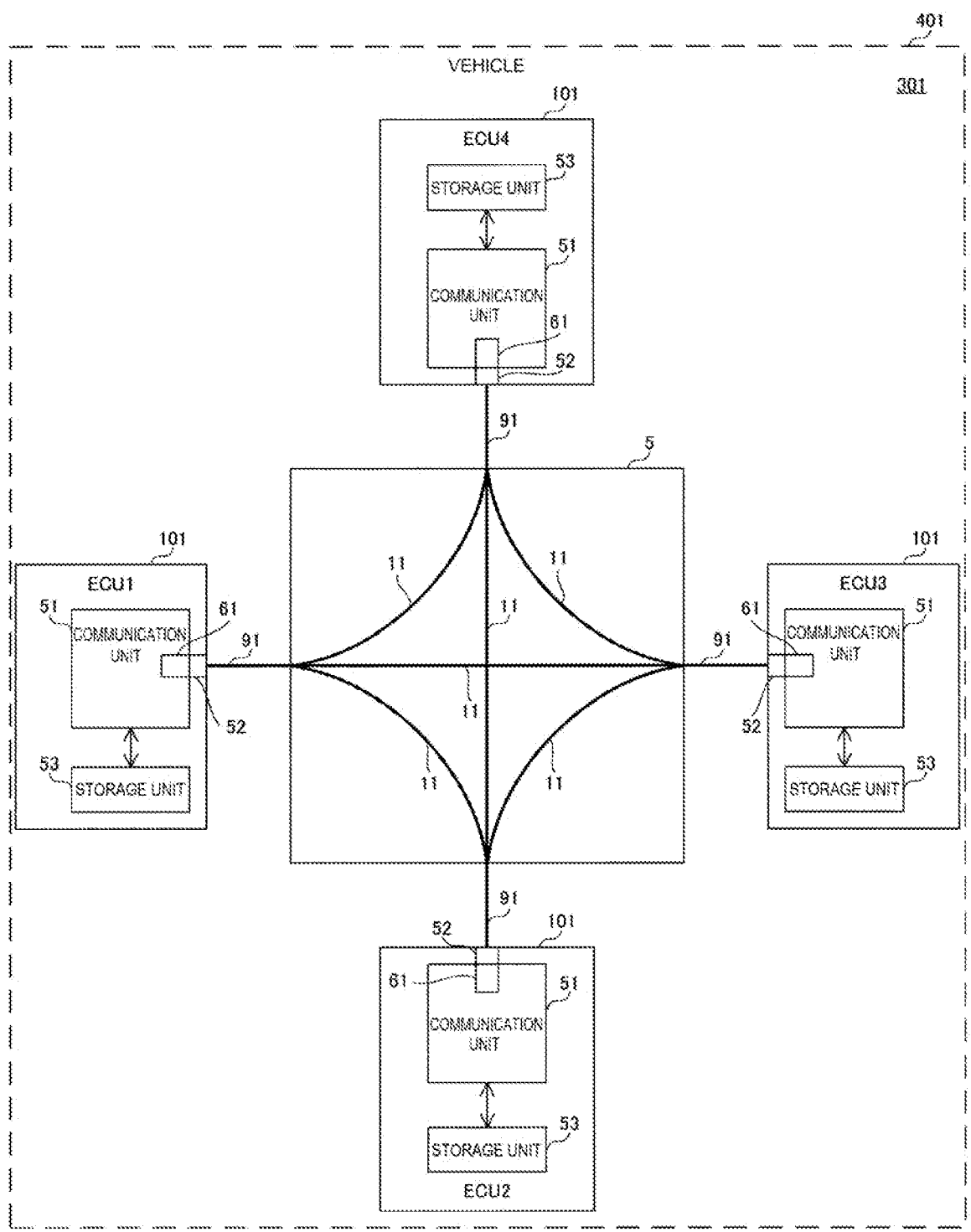
FIG. 9 illustrates the structure of a fourth modification to the on-board communication system according to the embodiment of the present disclosure.

FIG. 9 illustrates the structure of a fourth modification to the on-board communication system according to the embodiment of the present disclosure. Contents other than the contents described below are the same as those of the on-board communication system 301 illustrated in FIG. 1.

Referring to FIG. 9, the fourth modification to the on-board communication system 301 includes an optical coupler 5, the multiple optical fibers 91, and the multiple on-board devices 101.

The optical coupler 5 includes the multiple optical transmission lines 11 that are split in the optical coupler 5, that are connected to the multiple on-board devices 101 with the optical fibers 91 interposed therebetween, and that have different split ratios. The split ratio described herein is a ratio of power of light at each of output ports to the total power of light at all of the output ports of the optical coupler.

As for the optical coupler 5, for example, the split ratio for the on-board device 101 that is specified is set to a high split ratio. The split ratio can be set, for example, by adjusting the thickness of an optical waveguide or adjusting, for example, the length and diameter of a fusion extension portion of each optical fiber.

FIG. 10 illustrates an example of the split ratio of each optical transmission line in the fourth modification to the on-board communication system according to the embodiment of the present disclosure.

Referring to FIG. 10, as for the optical coupler 5, the split ratios to the ECU 1 corresponding to the on-board device 101 that transmits the synchronization information are set to a high split ratio.

That is, as for the optical coupler 5, the split ratios from the ECU 1 that is an output source to the ECUs 2 to 4 that are output destinations are 33.3%, the split ratios from the ECU 2 that is an output source to the ECUs 1, 3, and 4 that are output destinations are 50%, 25%, and 25%, the split ratios from the ECU 3 that is an output source to the ECUS 1, 2, and 4 that are output destinations are 50%, 25%, and 25%, the split ratios from the ECU 4 that is an output source to the ECUs 1, 2, and 3 that are output destinations are 50%, 25%, and 25%.

The bit error rate of the ethernet frame that is transmitted from the specified on-board device 101, here, the ECU 1 to the other ECUs can be decreased. The bit error rate described herein means a value that represents the ratio of frequency at which 1 is mistakenly determined to be zero, and zero is mistakenly determined to be 1.

The reliability of the vehicle 401 is improved, for example, in a manner in which the split ratio is set to a high split ratio for an important ECU such as the autonomous driving ECU or an ECU that is installed at the location in the vehicle 401 at which the environmental load such as temperature is high in addition to the ECU 1 that transmits the synchronization information, which is particularly effective.

That is, as for the fourth modification to the on-board communication system 301, the optical coupler 5 is designed depending on the kind of the on-board devices 101, for example, as a result of attention being paid to that the relationship of connection of the on-board devices 101 on the on-board network of the vehicle 401 is fixed, and that the relationship of communication of the on-board devices 101, that is, the relationship of an exchange of information is fixed.

[Fifth Modification]

Figure 11:
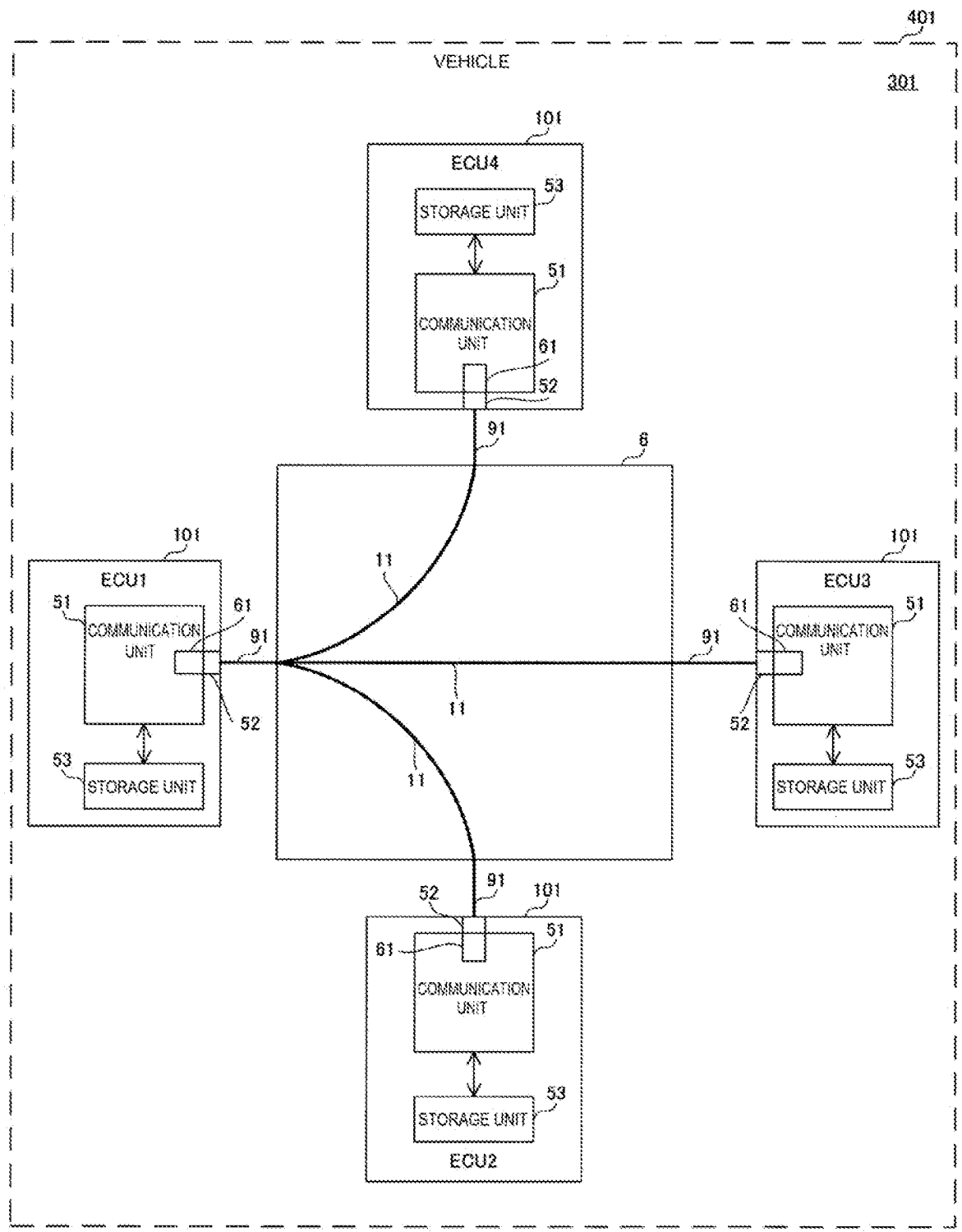
FIG. 11 illustrates the structure of a fifth modification to the on-board communication system according to the embodiment of the present disclosure.

FIG. 11 illustrates the structure of a fifth modification to the on-board communication system according to the embodiment of the present disclosure. Contents other than the contents described below are the same as those of the on-board communication system 301 illustrated in FIG. 1.

Referring to FIG. 11, the fifth modification to the on-board communication system 301 includes an optical coupler 6, the multiple optical fibers 91, and the multiple on-board devices 101.

The optical transmission lines 11 between the on-board devices 101 that are specified among combinations of the multiple on-board devices 101 that are connected to the optical coupler 6 are selectively provided in the optical coupler 6. That is, the optical transmission lines 11 that are associated with specified combinations of the on-board devices 101 are selectively provided in the optical coupler 6.

In an example illustrated in FIG. 11, the optical transmission lines are split in the optical coupler 6, and some combinations of the on-board devices 101 of the on-board communication system 301 are connected to each other by using the optical transmission lines 11. More specifically, the optical coupler 6 includes the optical transmission line 11 that is connected between the ECU 1 and the ECU 2, the optical transmission line 11 that is connected between the ECU 1 and the ECU 3, and the optical transmission line 11 that is connected between the ECU 1 and the ECU 4.

For example, according to the fifth modification, it is not necessary to transmit information among the ECU 2 to the ECU 4. For this reason, the optical transmission lines that connect the ECU 2 to the ECU 4 to each other are excluded in the optical coupler 6.

In this example, the ECU 1 that transmits the synchronization information is connected to the ECU 2 to the ECU 4. That is, at least one of the multiple on-board devices 101 of the on-board communication system 301 is connected to the other on-board devices 101 with the optical coupler 6 and the optical fibers 91 interposed therebetween.

According to the fifth modification, the ECU 1 surely receives information that is transmitted to the ECU 1, and accordingly, destination information is not necessarily needed for the ECU 2 to the ECU 4 that transmit the information to the ECU 1.

According to the fifth modification, there is no loss due to a split transmission line when the ECU 2 to the ECU 4 transmit the optical signal to the ECU 1, and consequently, the required optical output power of the optical transceivers of the ECU 2 to the ECU 4 is reduced. This enables an optical transceiver that has a relatively low performance and a low cost to be used and reduces costs. For example, in the case where the ECU 2 to the ECU 4 are sensors, and the ECU 1 is an ADAS (Advanced Driver Assistance System) ECU that performs a process, based on the result of measurement with the sensors, the structure according to the fifth modification is particularly effective.

That is, as for the fifth modification to the on-board communication system 301, the optical coupler 6 is designed depending on the kind of the on-board devices 101, for example, as a result of attention being paid to that the relationship of connection of the on-board devices 101 on the on-board network of the vehicle 401 is fixed, and that the relationship of communication of the on-board devices 101, that is, the relationship of an exchange of information is fixed.

The communication unit 51 of each on-board device 101 may be capable of communicating with the other multiple on-board devices 101 with the optical coupler interposed therebetween and may be capable of relaying information that is received from another on-board device 101 to another on-board device 101 that differs from the other on-board device 101 via the optical coupler.

For example, the fifth modification may have the structure described below. That is, according to the fifth modification, the communication unit 51 of the ECU 1 receives the optical signal at the optical transceiver 61 via the optical coupler 6 and the optical fiber 91 and acquires the ethernet frame that is included in the received optical signal. The communication unit 51 checks the destination MAC address in the ethernet frame. In the case where the destination MAC address is the MAC address of another ECU, the communication unit 51 generates the optical signal that contains the ethernet frame and transmits the optical signal to the other ECU via the optical fiber 91 and the optical coupler 6.

With this structure, the ECUs 2 to 4 are capable of transmitting the ethernet frame to another ECU via the ECU 1. That is, the on-board communication system 301 enables the relay process among the ECUs 2 to 4 to be achieved by using a simple structure in which the ECU 1 includes the single optical transceiver 61.

The on-board communication system 301 may include multiple master on-board devices that transmit the synchronization information.

For example, the fifth modification may have the structure described below. That is, according to the fifth modification, the on-board communication system 301 further includes an ECU 10 that transmits the synchronization information and that is not illustrated.

The optical coupler 6 further includes the optical transmission line 11 that is connected between the ECU 10 and the ECU 2, the optical transmission line 11 that is connected between the ECU 10 and the ECU 3, and the optical transmission line 11 that is connected between the ECU 10 and the ECU 4 unlike the structure illustrated in FIG. 11. That is, the ECU 10 that transmits the synchronization information is connected to the ECU 2 to the ECU 4.

The ECUs 1 to 4 of the on-board communication system 301 transmit information with a timing in accordance with the synchronization information that is received from the ECU 10, and consequently, the time division multiplexing communication is performed. More specifically, the ECU 10 transmits information with a timing in accordance with the synchronization information that is generated by itself. The ECUs 2 to 4 transmit information with a timing in accordance with the synchronization information that is received from the ECU 10.

As for the on-board communication system according to the embodiment of the present disclosure, the on-board devices 101 perform two-way communication but are not limited thereto. Part or all of the multiple on-board devices of the on-board communication system 301 may perform one-way communication.

As for the on-board communication system according to the embodiment of the present disclosure, the on-board devices 101 other than the master on-board device transmit information with a timing in accordance with the synchronization information that is received from the master on-board device, and consequently, the time division multiplexing communication is performed, but this is not a limitation. The on-board devices 101 may receive the synchronization information from another device other than the on-board devices 101.

The on-board communication system according to the embodiment of the present disclosure performs the time division multiplexing communication but is not limited thereto. For example, the on-board devices 101 may not perform the time division multiplexing communication but may implement control of information retransmission.

As for the on-board communication system according to the embodiment of the present disclosure, at least one of the multiple on-board devices 101 is connected to the other on-board devices 101 with the optical coupler interposed therebetween but is not limited thereto. For example, in the case where the on-board devices 101 implement the control of information retransmission as described above, it is not necessary to transmit the synchronization information, and accordingly, it is possible that there is no on-board device 101 that is connected to the other on-board devices 101 with the optical coupler interposed therebetween.

The on-board communication system according to the embodiment of the present disclosure includes the four on-board devices 101 and the optical coupler 1, for example, in FIG. 1 but is not limited thereto. The on-board communication system enables an excellent system that performs communication between on-board devices to be constituted, that is, the object of the present invention can be achieved, by using the minimum structure that includes three on-board devices 101 and an optical coupler that includes two optical transmission lines that connect one of the on-board devices 101 and the other two on-board devices 101.

Specifically, the optical coupler is used for the on-board communication system 301 that includes a first on-board device 101, a second on-board device 101, and a third on-board device 101. The optical coupler includes a first optical transmission line 11 that connects the first on-board device 101 and the second on-board device 101 to each other and a second optical transmission line 11 that connects the first on-board device 101 and the third on-board device 101 to each other.

By the way, there is a need for a technique that enables an excellent system that performs communication between on-board devices to be constituted beyond the technique disclosed in PTL 1.

For example, as for a structure for telecommunication between on-board devices with a switch device, an ECU that serves as the switch device needs components such as a transceiver and a communication IC (Integrated Circuit) and a control circuit such as a CPU (Central Processing Unit) that controls these. Accordingly, in many cases, costs increase, size increases, and weight increases. In addition, a cable for transmitting an electrical signal is composed of a metal conductor and gets heavy, and the weight of a vehicle increases. High-speed communication that enables a large amount of data to be transmitted is increasingly used to deal with an increase in the amount of communication on an on-board network, and the degradation of characteristics such as the EMC (electro-magnetic compatibility) and the transmission distance become a problem.

As for the on-board communication system according to the embodiment of the present disclosure, the optical couplers 1 to 5 include the multiple optical transmission lines 11. The multiple on-board devices 101 are capable of communicating with each other with the optical couplers 1 to 5 interposed therebetween.

The communication between the on-board devices 101 is thus performed by using the optical coupler that includes the multiple optical transmission lines 11. Consequently, a switch process, for example, is not needed, communication control can be simple, the use of an active element can be inhibited, and the weight of each transmission line can be decreased, for example, unlike a structure for telecommunication between the on-board devices 101 with a switch device. Accordingly, the cost of the on-board network can be decreased, size reduction can be achieved, and weight reduction can be achieved. For example, characteristics such as the EMC and the transmission distance can be improved.

Accordingly, the on-board communication system according to the embodiment of the present disclosure enables an excellent system that performs communication between on-board devices to be constituted.

As for the on-board communication system according to the embodiment of the present disclosure, the multiple on-board devices 101 include at least a master on-board device corresponding to the on-board device 101 that transmits the synchronization information for synchronizing the transmission timings of the multiple on-board devices 101. The on-board devices 101 other than the master on-board device transmit information, based on the synchronization information that is received from the master on-board device, and consequently, the time division multiplexing communication is performed.

With this structure, the communication between the on-board devices 101 can be smoothly performed by a simple process.

As for the on-board communication system according to the embodiment of the present disclosure, at least one of the multiple on-board devices 101 is connected to the other on-board devices 101 that are capable of communicating with the optical couplers 1 to 5 interposed therebetween.

With this structure, timing control for time division communication of the on-board devices 101, for example, can be implemented by using the optical coupler, and accordingly, the structure of each transmission line between the on-board devices 101 can be simple.

As for the on-board communication system according to the embodiment of the present disclosure, the optical coupler 2 further includes the optical transmission line 12 that connects the optical transmission lines 11 between the on-board devices 101 and the optical receiving circuit 71 outside the optical coupler 2 to each other and that is used for diagnosis to detect the state of the optical coupler 2.

With this structure, diagnosis of, for example, degradation over time can be effectively made for a transmission line structure that uses an optical coupler that has a high degree of necessity to monitor the degradation of, for example, the characteristics of a portion at which a transmission line is split, for example, unlike a structure for telecommunication between the on-board devices 101 with a switch device.

As for the on-board communication system according to the embodiment of the present disclosure, the optical transmission lines 11 between the on-board devices 101 that are specified among combinations of the multiple on-board devices 101 that are connected to the optical coupler 3 are selectively provided in the optical coupler 3.

With this structure, an unnecessary optical transmission line for the optical coupler can be excluded from the on-board network on which the relationship of communication of the on-board devices 101 is fixed, and parallel transmission of information can be achieved. Accordingly, the data communication capability on the on-board network can be increased.

As for the on-board communication system according to the embodiment of the present disclosure, the optical coupler 4 includes the multiple optical transmission lines 11 that are split in the optical coupler 4 and that are connected to the common on-board device 101.

With this structure, the duplication of the communication unit of each on-board device 101 and the duplication of a communication path can be achieved by using a simple structure in which the optical transmission lines 11 are split in the optical coupler 4.

As for the on-board communication system according to the embodiment of the present disclosure, the optical coupler 5 includes the multiple optical transmission lines 11 that are split in the optical coupler 5, that are connected to the multiple on-board devices 101, and that have different split ratios.

With this structure, communication stability can be determined for every on-board device 101 by using a simple method of designing the optical transmission lines 11 of the optical coupler 5, and accordingly, the reliability of communication on the on-board network can be improved.

As for the on-board communication system according to the embodiment of the present disclosure, the synchronization information defines the communication frame that contains the multiple time slots. The master on-board device assigns the time slots to the on-board devices 101 in the synchronization information such that the time slots are switched with the timing with which the on-board devices 101 do not transmit the packet such as the ethernet frame.

With this structure, it is prevented that each on-board device 101 transmits divided packets in communication frames and that another on-board device 101 that is a receiver cannot receive the packets, and the communication between the on-board devices 101 can be smoothly performed by a simple process.

The optical coupler according to the embodiment of the present disclosure is used for the on-board communication system 301 that includes the first on-board device 101, the second on-board device 101, and the third on-board device 101. The optical coupler includes the first optical transmission line 11 that connects the first on-board device 101 and the second on-board device 101 to each other and the second optical transmission line 11 that connects the first on-board device 101 and the third on-board device 101 to each other.

The communication between the on-board devices 101 is thus performed by using the optical coupler that includes the multiple optical transmission lines 11. Consequently, the switch process, for example, is not needed, the communication control can be simple, the use of the active element can be inhibited, and the weight of each transmission line can be decreased, for example, unlike a structure for telecommunication between the on-board devices 101 with a switch device. Accordingly, the cost of the on-board network can be decreased, the size reduction can be achieved, and the weight reduction can be achieved. For example, the characteristics such as the EMC and the transmission distance can be improved.

Accordingly, the optical coupler according to the embodiment of the present disclosure enables an excellent system that performs communication between on-board devices to be constituted.

As for each on-board device according to the embodiment of the present disclosure, the communication unit 51 communicates with another on-board device 101 with the optical couplers 1 to 5 that include the multiple optical transmission lines 11 interposed therebetween. The connection unit 52 is connectable to the optical fiber 91 that is connected to the optical transmission lines 11.

The communication between the on-board devices 101 is thus performed by using the optical coupler that includes the multiple optical transmission lines 11. Consequently, the switch process, for example, is not needed, the communication control can be simple, the use of the active element can be inhibited, and the weight of each transmission line can be decreased, for example, unlike a structure for telecommunication between the on-board devices 101 with a switch device. Accordingly, the cost of the on-board network can be decreased, the size reduction can be achieved, and the weight reduction can be achieved. For example, the characteristics such as the EMC and the transmission distance can be improved.

Accordingly, the on-board devices according to the embodiment of the present disclosure enable an excellent system that performs communication between on-board devices to be constituted.

As for each on-board device according to the embodiment of the present disclosure, the communication unit 51 is capable of communicating with the multiple other on-board devices 101 with the optical coupler interposed therebetween and is capable of relaying information that is received from another on-board device 101 to another on-board device 101 that differs from the other on-board device 101 via the optical coupler.

With this structure, the relay process among the other on-board devices 101 can be achieved by using, for example, a simple structure in which each on-board device 101 includes the single optical transceiver.

Parts or the whole of operation and components in the examples of the on-board communication system according to the embodiment of the present disclosure can be appropriately combined.

It should be thought that the embodiment is described above by way of example in all aspects and is not restrictive. The scope of the present invention is not shown by the above description but is shown by the scope of claims and includes all modifications having the equivalent meaning and scope to those of the claims.

The above description contains features described below.

[Additional Remark 1]

An on-board communication system includes an optical coupler that includes multiple optical transmission lines, and multiple on-board devices that are capable of communicating with each other with the optical coupler interposed therebetween. The multiple optical transmission lines are optical waveguides. The optical coupler is designed depending on the kind of the multiple on-board devices.

[Additional Remark 2]

An optical coupler that is used for an on-board communication system that includes a first on-board device, a second on-board device, and a third on-board device. The optical coupler includes a first optical transmission line that connects the first on-board device and the second on-board device to each other, and a second optical transmission line that connects the first on-board device and the third on-board device to each other. The optical transmission lines are optical waveguides. The optical coupler is designed depending on the kind of the on-board devices.

[Additional Remark 3]

An on-board device for an on-board communication system that includes an optical coupler that includes multiple optical transmission lines. The on-board device includes a communication unit that communicates with another on-board device with the optical coupler interposed therebetween, and a connection unit that is connectable to an optical fiber that is connected to the multiple optical transmission lines. The multiple optical transmission lines are optical waveguides. The optical coupler is designed depending on the kind of the on-board devices.

REFERENCE SIGNS LIST 1 to 6 optical coupler
11, 12 optical transmission line
51, 55 communication unit
52, 54 connection unit
53 storage unit
61, 62 optical transceiver
71 optical receiving circuit
91, 92 optical fiber
101 on-board device
151 diagnosis circuit
301 on-board communication system
401 vehicle

The invention claimed is:

1. An on-board communication system comprising:
    an optical coupler that includes multiple optical transmission lines; and
    multiple on-board devices that are capable of communicating with each other with the optical coupler interposed therebetween, wherein
    the multiple on-board devices include at least a master on-board device corresponding to the on-board device that transmits synchronization information for synchronizing transmission timings of the multiple on-board devices,
    each of the multiple on-board devices other than the master on-board device transmits information, based on the synchronization information that is received from the master on-board device to perform time division multiplexing communication,
    the synchronization information defines a communication frame that contains multiple time slots, and
    the master on-board device assigns the multiple time slots to the multiple on-board devices in the synchronization information such that the multiple time slots are switched with a timing with which the multiple on-board devices do not transmit a packet.

2. The on-board communication system according to claim 1, wherein at least one of the multiple on-board devices is connected to the other on-board devices that are capable of communicating with the optical coupler interposed therebetween.

3. The on-board communication system according to claim 2, wherein the optical coupler further includes an optical transmission line that connects the multiple optical transmission lines between the multiple on-board devices and an optical receiving circuit outside the optical coupler to each other and that is used for diagnosis to detect a state of the optical coupler.

4. The on-board communication system according to claim 2, wherein an optical transmission line between the on-board devices that are specified among combinations of the multiple on-board devices that are connected to the optical coupler is selectively provided in the optical coupler.

5. The on-board communication system according to claim 2, wherein the optical coupler includes multiple optical transmission lines that are split in the optical coupler and that are connected to the on-board device that is common.

6. The on-board communication system according to claim 2, wherein the optical coupler includes multiple optical transmission lines that are split in the optical coupler, that are connected to the multiple on-board devices, and that have different split ratios.

7. The on-board communication system according to claim 1, wherein the optical coupler further includes an optical transmission line that connects the multiple optical transmission lines between the multiple on-board devices and an optical receiving circuit outside the optical coupler to each other and that is used for diagnosis to detect a state of the optical coupler.

8. The on-board communication system according to claim 1, wherein an optical transmission line between the on-board devices that are specified among combinations of the multiple on-board devices that are connected to the optical coupler is selectively provided in the optical coupler.

9. The on-board communication system according to claim 1, wherein the optical coupler includes multiple optical transmission lines that are split in the optical coupler and that are connected to the on-board device that is common.

10. The on-board communication system according to claim 1, wherein the optical coupler includes multiple optical transmission lines that are split in the optical coupler, that are connected to the multiple on-board devices, and that have different split ratios.

11. An optical coupler that is used for an on-board communication system that includes a first on-board device, a second on-board device, and a third on-board device, the optical coupler comprising:
    a first optical transmission line that connects the first on-board device and the second on-board device to each other; and
    a second optical transmission line that connects the first on-board device and the third on-board device to each other, wherein
    the first on-board device is a master on-board device corresponding to the on-board device that transmits synchronization information for synchronizing transmission timings between the second on-board device and between the third on-board device, the second on-board device receives the synchronization information from the master on-board device with the first optical transmission line interposed therebetween, the third on-board device receives the synchronization information from the master on-board device with the second optical transmission line interposed therebetween, the second on-board device and the third on-board device transmit information, based on the synchronization information that is received from the master on-board device to perform time division multiplexing communication, the synchronization information defines a communication frame that contains multiple time slots, and the master on-board device assigns the multiple time slots to the second on-board device and the third on-board device in the synchronization information such that the multiple time slots are switched with a timing with which the second on-board device and the third on-board device do not transmit a packet.

12. An on-board device for an on-board communication system that includes an optical coupler that includes multiple optical transmission lines, the on-board device comprising:

a communication unit that communicates with another on-board device with the optical coupler interposed therebetween; and a connection unit that is connectable to an optical fiber that is connected to the multiple optical transmission lines, wherein the communication unit performs time division multiplexing communication with another on-board device with the connection unit and the multiple optical transmission lines of the optical coupler interposed therebetween, based on synchronization information for synchronizing transmission timings, the synchronization information defines a communication frame that contains multiple time slots, and the communication frame is assigned the multiple time slots to the on-board device and another on-board device such that the multiple time slots are switched with a timing with which the on-board device and another on-board device do not transmit a packet.

13. The on-board device according to claim 12, wherein the communication unit is capable of communicating with multiple other on-board devices with the optical coupler interposed therebetween and is capable of relaying information that is received from another on-board device to another on-board device that differs from the other on-board device via the optical coupler.

* * * * *